(12) United States Patent
Imamura et al.

(10) Patent No.: US 11,242,046 B2
(45) Date of Patent: Feb. 8, 2022

(54) CONTROL SYSTEM FOR HYBRID VEHICLE

(71) Applicant: TOYOTA JIDOSHA KABUSHIKI KAISHA, Toyota (JP)

(72) Inventors: Tatsuya Imamura, Okazaki (JP); Kazuma Aoki, Toyota (JP); Yasuhiro Oshiumi, Gotemba (JP); Yukari Okamura, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 16/601,716

(22) Filed: Oct. 15, 2019

(65) Prior Publication Data

US 2020/0148190 A1 May 14, 2020

(30) Foreign Application Priority Data

Nov. 9, 2018 (JP) .............................. JP2018-211753

(51) Int. Cl.
*B60W 10/115* (2012.01)
*B60W 20/20* (2016.01)
(Continued)

(52) U.S. Cl.
CPC ............. *B60W 20/20* (2013.01); *B60K 6/365* (2013.01); *B60K 6/442* (2013.01); *B60W 10/06* (2013.01);
(Continued)

(58) Field of Classification Search
CPC ...... B60W 20/20; B60W 10/06; B60W 10/08; B60W 10/115; B60W 2510/0638; B60W 2540/10; B60W 2710/1005; B60W 20/16; B60W 20/30; B60W 20/10; B60W 2510/06; B60W 2710/06; B60W 2710/08; B60W 2710/10; B60K 2006/381; B60K 6/387; B60K 6/547; B60K 6/445; B60K 6/365; B60K 6/442; F16H 2702/02; F16H 2200/20; F16H 48/06; F16H 37/0806; F16H 2200/0052; B60Y 2200/92; B60Y 2300/18008; Y02T 10/12; Y02T 10/40; Y02T 10/62; Y02A 50/20; F01N 2900/08; F01N 2900/10; F01N 2900/1404; F01N 2900/1602; F01N 2430/08; F01N 2590/11;
(Continued)

(56) References Cited

U.S. PATENT DOCUMENTS 10,914,213 B2 * 2/2021 Takada ............... B01D 53/9495
11,022,061 B1 * 6/2021 Christensen ............ F02P 5/045
(Continued)

FOREIGN PATENT DOCUMENTS

CN 106062346 A * 10/2016 ............ B60W 20/16
JP 2017-007437 A 1/2017

*Primary Examiner* — Justin Holmes
(74) *Attorney, Agent, or Firm* — Oliff PLC

(57) ABSTRACT

A control system for a hybrid vehicle configured to prevent a reduction in the purifying performance of the catalyst in a predetermined operating mode. An operating mode of the hybrid vehicle can be selected from a first hybrid vehicle mode, a second hybrid vehicle mode, and a fixed mode. A controller that is configured to restrict a shifting operation between the first hybrid vehicle mode and the second hybrid vehicle mode via the fixed mode, when the purifying device is being warmed or the purifying device has to be warmed.

8 Claims, 12 Drawing Sheets

(51) Int. Cl.
| | |
|---|---|
| *B60W 10/06* | (2006.01) |
| *B60W 10/08* | (2006.01) |
| *B60K 6/365* | (2007.10) |
| *B60K 6/442* | (2007.10) |
| *F01N 13/00* | (2010.01) |
| *F16H 48/06* | (2006.01) |
| *F16H 37/08* | (2006.01) |
| *B60W 20/10* | (2016.01) |

(52) U.S. Cl.
CPC .......... *B60W 10/08* (2013.01); *B60W 10/115* (2013.01); *B60W 20/10* (2013.01); *F01N 13/00* (2013.01); *F16H 37/0806* (2013.01); *F16H 48/06* (2013.01); *B60W 2510/06* (2013.01); *B60W 2710/06* (2013.01); *B60W 2710/08* (2013.01); *B60W 2710/10* (2013.01); *B60Y 2200/92* (2013.01); *B60Y 2300/18008* (2013.01); *F01N 2900/0602* (2013.01); *F16H 2200/0052* (2013.01); *F16H 2200/20* (2013.01); *F16H 2702/02* (2013.01)

(58) Field of Classification Search
CPC ...... F01N 9/00; F01N 3/2006; F01N 2430/06; F01N 2430/00; F01N 13/00; F01N 2900/0602; F02P 5/15; F02D 41/024; F02D 29/02
See application file for complete search history.

(56) References Cited

U.S. PATENT DOCUMENTS

2016/0368361 A1   12/2016  Endo et al.
2018/0086331 A1*  3/2018  Sato ................... F02D 41/0077

* cited by examiner

| Operating Mode | | CL1 | CL2 | B1 | MG1 | MG2 | ENG |
|---|---|---|---|---|---|---|---|
| HV Mode | HV-Low Mode | ● | – | – | G | M | ON |
| | HV-High Mode | – | ● | – | G | M | ON |
| | Fixed Mode | ● | ● | – | | | ON |
| EV Mode | Dual-Motor Mode / EV-Low Mode | ● | – | ● | M | M | OFF |
| | Dual-Motor Mode / EV-High Mode | – | ● | ● | M | M | OFF |
| | Single-Motor Mode | – | – | – | | M | OFF |

Fig. 3

CONTROL SYSTEM FOR HYBRID VEHICLE

CROSS-REFERENCE TO RELATED APPLICATIONS

The present disclosure claims the benefit of Japanese Patent Application No. 2018-211753 filed on Nov. 9, 2018 with the Japanese Patent Office, the disclosures of which are incorporated herein by reference in its entirety.

BACKGROUND

Field of the Disclosure

Embodiments of the present disclosure relate to the art of a control system for a hybrid vehicle in which a prime mover includes an engine and a motor.

Discussion of the Related Art

JP-A-2017-007437 describes a drive unit for a hybrid vehicle in which an output torque of an engine is distributed to a first motor and to an output side through a power split mechanism, and in which an output torque of a second motor driven by electricity supplied from the first motor is synthesized with the engine torque. In the hybrid vehicle taught by JP-A-2017-007437, an operating mode may be shifted by manipulating a first clutch and a second clutch of the drive unit. For example, in the hybrid vehicle taught by JP-A-2017-007437, the operating mode may be selected from a hybrid-low mode, a hybrid-high mode and a fixed mode, and a ratio between an engine speed and output speed is changed by shifting the operating mode. The fixed mode is established by engaging both of the first clutch and the second clutch, and in the fixed mode, rotary elements of a power split mechanism are rotated at a same speed, that is, a speed ratio is fixed.

In the hybrid vehicle taught by JP-A-2017-007437, the operating mode is selected based on a vehicle speed and a required driving force, and the operating mode may be shifted between the hybrid-low mode and the hybrid-high mode via the fixed mode.

In the conventional vehicle, a three-way catalyst is arranged in an exhaust pipe of an engine to purify determinantal substance contained in an exhaust gas. For example, in a case of starting the engine at a low temperature, a temperature of the catalyst is also low. In this case, therefore, an operating point of the engine is adjusted to a point suitable to warm up the catalyst thereby raising the temperature of the of the catalyst. However, in the fixed mode, the rotary elements of the power split mechanism are rotated at a same speed and hence a speed of the engine is fixed to a constant speed. Therefore, if the operating mode is shifted between the hybrid-low mode and the hybrid-high mode via the fixed mode, the operating point of the engine may be shifted from the point suitable to warm up the catalyst. In this case, therefore, the catalyst may not be warmed up sufficiently and purifying performance of the catalyst may be reduced.

SUMMARY

Aspects of embodiments of the present disclosure have been conceived noting the foregoing technical problems, and it is therefore an object of the present disclosure to provide a control system for a hybrid vehicle that prevents a reduction in the purifying performance of the catalyst in a predetermined operating mode.

The control system according to the embodiment of the present disclosure is applied to a hybrid vehicle comprising: an engine; a purification device that purifies an exhaust gas of the engine; a first motor having a generating function; and a differential mechanism comprising an input element connected to the engine, a reaction element connected to the first motor, and an output element connected to a drive wheel. An operating mode of the hybrid vehicle can be selected from: a first hybrid vehicle mode in which a speed ratio between the engine and the output member can be varied continuously by the differential mechanism, and a torque of the engine is delivered to the output member at a first predetermined ratio; a second hybrid vehicle mode in which the speed ratio between the engine and the output member can be varied continuously by the differential mechanism, and the torque of the engine is delivered to the output member at a second predetermined ratio that is smaller than the first predetermined ratio; and a fixed mode in which the input element and the output element are rotated at same speeds. In order to achieve the above-explained objective, according to the exemplary embodiment of the present disclosure, the control system is provided with a controller that is configured to: determine whether the purifying device is being warmed or the purifying device has to be warmed, when shifting the operating mode between the first hybrid vehicle mode and the second hybrid vehicle mode; and restrict a shifting operation between the first hybrid vehicle mode and the second hybrid vehicle mode via the fixed mode, when the purifying device is being warmed or the purifying device has to be warmed.

In a non-limiting embodiment, the controller may be further configured to determine that the purifying device has to be warmed if a temperature of the purifying device is lower than a predetermined level.

In a non-limiting embodiment, the controller may be further configured to raise the temperature of the purifying device by retarding an ignition timing of the engine.

In a non-limiting embodiment, the controller may be further configured to shift the operating mode between the first hybrid vehicle mode and the second hybrid vehicle mode before starting a warm-up of the purifying device, if the purifying device has to be warmed.

In a non-limiting embodiment, the controller may be further configured to maintain a current operating mode or to shift the operating mode between the first hybrid vehicle mode and the second hybrid vehicle mode without establishing the fixed mode temporarily, when restricting the shifting operation between the first hybrid vehicle mode and the second hybrid vehicle mode via the fixed mode.

In a non-limiting embodiment, the controller may be further configured to: determine whether to maintain the operating mode to the current mode or to shift the operating mode between the first hybrid vehicle mode and the second hybrid vehicle mode without establishing the fixed mode temporarily, based on a required drive force; shift the operating mode between the first hybrid vehicle mode and the second hybrid vehicle mode without establishing the fixed mode temporarily if the required drive force is less than a predetermined value; and maintain the operating mode to the current mode if the required drive force is equal to or greater than the predetermined value.

In a non-limiting embodiment, the controller may be further configured to allow the shifting operation between the first hybrid vehicle mode and the second hybrid vehicle mode via the fixed mode, if the speed of the engine falls within a predetermined range suitable to warm the purifying device.

In a non-limiting embodiment, the hybrid vehicle may further comprise a second motor that is connected to drive wheels in a torque transmittable manner. The differential mechanism may include: a first planetary gear unit that performs a differential action among a first input element, a first reaction element, and a first output element; a second planetary gear unit that performs a differential action among a second input element, a second reaction element, and a second output element; a first engagement device that selectively connects the first input element to the second input element; and a second engagement device that selectively connects any two of the rotary elements to rotate the second planetary gear unit integrally. In the differential mechanism, the first input element may be connected to the engine, the first reaction element may be connected to the first motor, the first output element may be connected to the second input element, and the second output element may be connected to a member of the drive wheel side. In the hybrid vehicle, the first hybrid vehicle mode may be established by engaging the first engagement device while disengaging the second engagement device, the second hybrid vehicle mode may be established by disengaging the first disengagement device while engaging the second engagement device, and the fixed mode may be established by engaging both of the first disengagement device and the second engagement device.

Thus, according to the embodiment of the present disclosure, the shifting operation between the first hybrid vehicle mode and the second hybrid vehicle mode via the fixed mode is restricted if the purifying device is being warmed or the purifying device has to be warmed. According to the embodiment of the present disclosure, therefore, an operating point of the engine will not be shifted from the point at which the catalyst can be warmed up efficiently due to establishment of the fixed mode in which a speed ratio between the input element and the output element is fixed. For this reason, the catalyst can be warmed up promptly to purify exhaust gas.

When the shifting between the first hybrid mode and the second hybrid mode via the fixed mode is restricted, the operating mode may be maintained to the current mode, or shifted to the desired hybrid mode without establishing the fixed mode temporarily, depending on the required drive force. For example, if the required drive forced is less than a predetermined value, the operating mode is shifted between the first hybrid vehicle mode and the second hybrid vehicle mode via an electric vehicle mode while stopping the engine. In this case, therefore, the engine will not discharge the exhaust gas while the being stopped, and the engine can be operated at the point suitable to warm the catalyst after started.

As described, the operating point of the engine may be deviated from the point at which the catalyst can be warmed efficiently if the operating mode is shifted to the fixed mode. In order to prevent such disadvantage, the shifting operation between the first hybrid and the second hybrid mode via the fixed mode is restricted during the warm-up of the catalyst. However, the shifting operation between the first hybrid and the second hybrid mode via the fixed mode is allowed if the speed of the engine falls within the predetermined range suitable to warm the catalyst. In this case, the operating point of the engine will not be deviated significantly from the point at which the catalyst can be warmed efficiently even if the operating mode is shifted between the first hybrid and the second hybrid mode via the fixed mode. For this reason, the catalyst may be warmed efficiently even if the fixed mode is established temporarily.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a table showing engagement states of engagement devices and operating conditions of the prime movers in each operating mode;

DETAILED DESCRIPTION OF THE PREFERRED EMBODIMENT(S)

Figure 1:
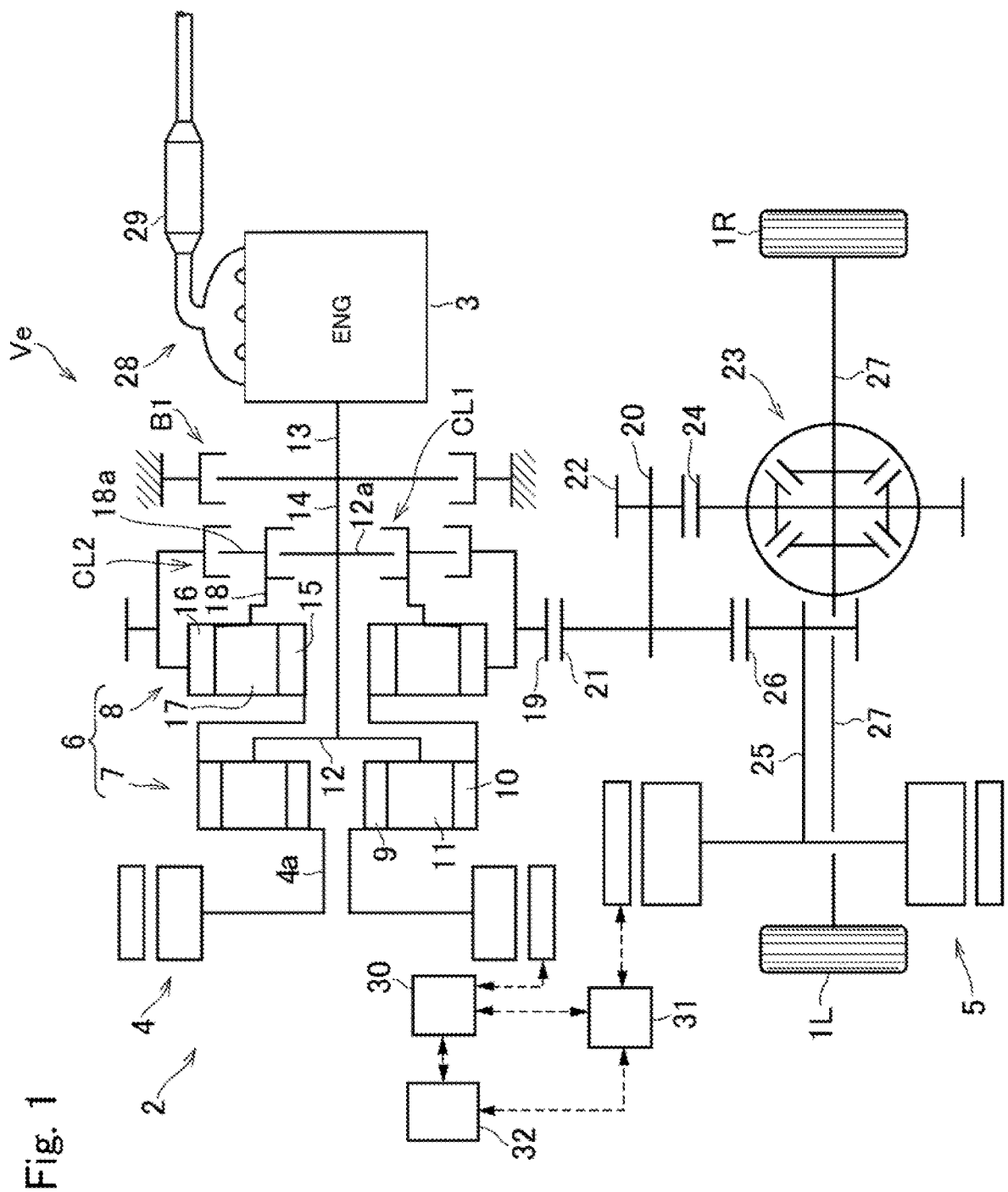
FIG. 1 is a skeleton diagram showing a drive unit of a hybrid vehicle to which the control system according to embodiment of the present disclosure is applied.

Preferred embodiments of the present application will now be explained with reference to the accompanying drawings. Referring now to FIG. 1, there is shown one example of a structure of a hybrid vehicle (as will be simply called the "vehicle" hereinafter) Ve to which the control system according to the embodiment is applied. Specifically, FIG. 1 shows a drive unit 2 of the vehicle Ve that drives a pair of front wheels 1R and 1L, and the drive unit 2 comprises an engine (referred to as "ENG" in the drawings) 3, a first motor (referred to as "MG1" in the drawings) 4, and a second motor (referred to as "MG2" in the drawings) 5. According to the exemplary embodiment, a motor-generator having a generating function is adopted as the first motor 4. In the vehicle Ve, a speed of the engine 3 is controlled by the first motor 4, and the second motor 5 is driven by electric power generated by the first motor 4 to generate a drive force for propelling the vehicle Ve. Optionally, the motor-generator having a generating function may also be employed as the second motor 5.

A power split mechanism 6 as a differential mechanism is connected to the engine 3. The power split mechanism 6 includes a power split section 7 that distributes an output torque of the engine 3 to the first motor 4 side and to an output side, and a transmission section 8 that alters a torque split ratio.

For example, a single-pinion planetary gear unit adapted to perform differential action among three rotary elements may be used as the power split section 7. That is, the power split section 7 serves as a first planetary gear unit of the embodiment. Specifically, the power split section 7 comprises: a sun gear 9; a ring gear 10 as an internal gear arranged concentrically with the sun gear 9; a plurality of pinion gears 11 interposed between the sun gear 9 and the ring gear 10 while being meshed with both gears 9 and 10; and a carrier 12 supporting the pinion gears 11 in a rotatable manner. In the power split section 7, accordingly, the sun gear 9 serves mainly as a first reaction element, the ring gear 10 serves mainly as a first output element, and the carrier 12 serves mainly as a first input element.

An output shaft 13 of the engine 3 is connected to an input shaft 14 of the power split mechanism 6 connected to the carrier 12 so that output power of the engine 3 is applied to the carrier 12. Optionally, an additional gear unit may be interposed between the input shaft 14 and the carrier 12, and a damper device and a torque converter may be interposed between the output shaft 13 and the input shaft 14.

The sun gear 9 is connected to the first motor 4. In the embodiment shown in FIG. 1, the power split section 7 and the first motor 4 are arranged concentrically with a rotational center axis of the engine 3, and the first motor 4 is situated on an opposite side of the engine 3 across the power split section 7. The transmission section 8 as a second planetary gear unit is interposed coaxially between the power split section 7 and the engine 3.

Specifically, the transmission section 8 is a single-pinion planetary gear unit comprising: a sun gear 15; a ring gear 16 as an internal gear arranged concentrically with the sun gear 15; plurality of pinion gears 17 interposed between the sun gear 15 and the ring gear 16 while being meshed with both gears 17 and 18; and a carrier 18 supporting the pinion gears 17 in a rotatable manner. Thus, the transmission section 8 is also adapted to perform a differential action among the sun gear 15, the ring gear 16, and the carrier 18. In the transmission section 8 the sun gear 15 is connected to the ring gear 10 of the power split section 7, and the ring gear 16 is connected to an output gear 19. Accordingly, the sun gear 15 serves as a second reaction element, the carrier 18 serves as a second input element, and the ring gear 16 serves as a second output element.

In order to use the power split section 7 and the transmission section 8 as a complex planetary gear unit, a first clutch CL1 as a first engagement device is disposed to selectively connect the carrier 18 of the transmission section 8 to the carrier 12 of the power split section 7. Specifically, a rotary disc 12a is fitted onto the input shaft 14, and the first clutch CL1 engages the rotary disc 12a selectively with the carrier 18 of the transmission section 8. For example, a wet-type multiple plate clutch or a dog clutch may be employed as the first clutch CL1. Otherwise, a normally stay clutch may also be employed as the first clutch CL1. An engagement state of the normally stay clutch is switched upon reception of the command signal, and the normally stay clutch stays in the current engagement state even if the signal transmission thereto is interrupted. Thus, in the drive unit 2 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element. That is, the complex planetary gear unit is configured such that the input shaft 14, the output shaft 4a of the first motor 4, and the driven gear 21 are allowed to rotate in a differential manner.

A second clutch CL2 as a second engagement device is disposed to rotate the rotary elements of the transmission section 8 integrally. For example, a friction clutch, a dog clutch and a normally stay clutch may also be used as the second clutch CL2 to selectively connect the carrier 18 to the ring gear 16 or the sun gear 15, or to connect the sun gear 15 to the ring gear 16. In the drive unit 2 shown in FIG. 1, specifically, the second clutch CL2 is adapted to connect the carrier 18 to the ring gear 16 to rotate the rotary elements of the transmission section 8 integrally. Specifically, a rotary disc 18a is provided to be rotated integrally with the carrier 18, and the second clutch CL2 engages the rotary disc 18a selectively with the ring gear 16 of the transmission section 8

The first clutch CL1 and the second clutch CL2 are arranged coaxially with the engine 3, the power split section 7, and the transmission section 8 on the opposite side of the power split section 7 across the transmission section 8. The first clutch CL1 and the second clutch CL2 may be arranged not only in parallel to each other in a radial direction but also in tandem in an axial direction. In the drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, number of friction plates of the frictional clutch can be reduced.

A counter shaft 20 extends parallel to a common rotational axis of the engine 3, the power split section 7, and the transmission section 8. A driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction. The driven gear 21 is also meshed with a drive gear 26 fitted onto a rotor shaft 25 of the second motor 5 so that power or torque of the second motor 5 is synthesized with power or torque of the output gear 19 at the driven gear 21 to be distributed from the differential gear unit 23 to the front wheels 1R and 1L via each driveshaft 27.

In order to selectively stop a rotation of the output shaft 13 or the input shaft 14 for the purpose of delivering the drive torque generated by the first motor 4 to the front wheels 1R and 1L, a brake B1 as a third engagement device is arranged in the drive unit 2. For example, a frictional engagement device or a dog brake may be used as the brake B1. Specifically, the carrier 12 of the power split section 7 and the carrier 18 of the transmission section 8 are allowed to serve as reaction elements, and the sun gear 9 of the power split section 7 is allowed to serve as an input element by applying the brake B1 to halt the output shaft 13 or the input shaft 14. To this end, the brake B1 may be adapted to stop the rotation of the output shaft 13 or the input shaft 14 not only completely but also incompletely to apply a reaction torque to those shafts. Alternatively, a one-way clutch may be used instead of the brake B1 to restrict a reverse rotation of the output shaft 13 or the input shaft 14.

An exhaust gas purifying catalyst (as will be simply called the "catalyst" or "catalyst converter") 29 as a purifying device is arranged in an exhaust system 28. The catalyst 29 is adapted to reduce concentration of the exhaust gas by oxidizing HC (i.e., hydrocarbons) and CO (i.e., carbon monoxide) and reducing nitrogen oxide. To this end, a temperature of the catalyst 29 has to be raised to an activation temperature, and an upper limit temperature is set to limit thermal damage on the catalyst 29.

A first power control system 30 is connected to the first motor 4 and a second power control system 31 is connected to the second motor. Each of the first power control system 30 and the second power control system 31 individually includes an inverter and a converter. The first power control system 30 and the second power control system 31 are connected to each other, and also connected individually to an electric storage device 32 including a lithium ion battery, a capacitor, and a solid-state battery. For example, when the first motor 4 is operated as a generator while establishing a reaction torque, an electric power generated by the first motor 4 may be supplied directly to the second motor 5 without passing through the electric storage device 32.

Characteristics of the lithium ion battery, the capacitor, and the solid-state battery adopted as the electric storage device 32 are different from one another. The electric storage device 32 may be formed by combining those storage devices arbitrarily according to need.

Figure 2:
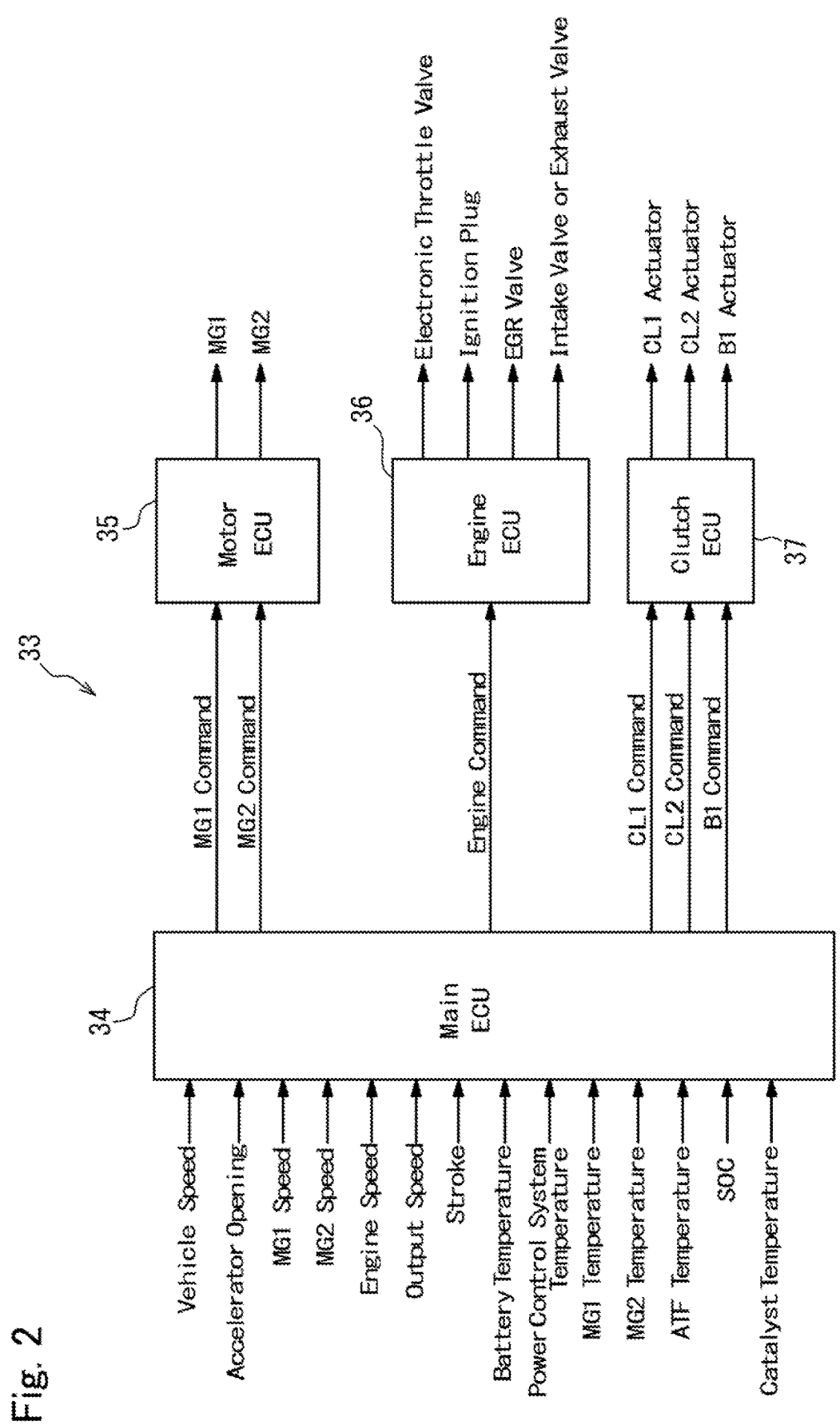
FIG. 2 is a block diagram showing a structure of an electronic control unit.

In order to control the first power control system 30, the second power control system 31, the first clutch CL1, the second clutch CL2, the brake B1 and so on, the vehicle Ve is provided with an electronic control unit (to be abbreviated as the "ECU" hereinafter) 33 as a controller. The ECU 33 has a microcomputer as its main constituent, and as shown in FIG. 2, the ECU 33 comprises a main ECU 34, a motor ECU 35, an engine ECU 36 and a clutch ECU 37.

The main ECU 34 is configured to execute a calculation based on incident data transmitted from sensors as well as maps and formulas installed in advance, and transmits a calculation result to the motor ECU 35, the engine ECU 36 and the clutch ECU 37 in the form of command signal. For example, the main ECU 34 receives data about; a vehicle speed; an accelerator position; a speed of the first motor 4; a speed of the second motor 5; a speed of the output shaft 13 of the engine 3; an output speed such as a speed of the counter shaft 20 of the transmission section 8; strokes of pistons of the clutches CL1, CL2, the brake B1; a temperature of the electric storage device 32; temperatures of the power control systems 30, 31; a temperature of the first motor 4; a temperature of the second motor 5; a temperature of oil (i.e., ATF) lubricating the power split section 7 and the transmission section 8; a state of charge (to be abbreviated as the "SOC" hereinafter) level of the electric storage device 32; a temperature of the catalyst 29 and so on.

Specifically, command signals of output torques and speeds of the first motor 4, the second motor 5 are transmitted from the main ECU 34 to the motor ECU 35. Likewise, command signals of an output torque and a speed of the engine 3 are transmitted from the main ECU 34 to the engine ECU 36, and command signals of torque transmitting capacities (including "0") of the clutches CL1, CL2, and the brakes B1 are transmitted from the main ECU 34 to the clutch ECU 37.

The motor ECU 35 calculates current values applied to the first motor 4 and the second motor 5 based on the data transmitted from the main ECU 34, and transmits calculation results to the motors 4, 5 in the form of command signals. In the vehicle Ve, an AC motor is used as the first motor 4 and the second motor 5 respectively. In order to control the AC motor, the command signal transmitted from the motor ECU 35 includes command signals for controlling a frequency of a current generated by the inverter and a voltage value boosted by the converter.

The engine ECU 36 calculates current values to control opening degrees of an electronic throttle valve, an EGR (Exhaust Gas Restriction) valve, an intake valve, an exhaust valve, and to activate an ignition plug, based on the data transmitted from the main ECU 34. Calculation results are transmitted from the engine ECU 36 to the valves and the plug in the form of command signals. Thus, the engine ECU 36 transmits command signals for controlling a power, an output torque and a speed of the engine 3.

The clutch ECU 37 calculates current values supplied to actuators controlling engagement pressures of the clutches CL1, CL2, and the brake B1 based on the data transmitted from the main ECU 34, and transmits calculation results to the actuators in the form of command signals.

In the vehicle Ve, an operating mode may be selected from a hybrid mode (to be abbreviated as the "HV mode" hereinafter) in which the vehicle Ve is propelled by a drive torque generated by the engine 3, and an electric vehicle mode (to be abbreviated as the "EV mode" hereinafter) in which the vehicle Ve is propelled by drive torques generated by the first motor 4 and the second motor 5 without using the engine 3. The HV mode may be selected from a hybrid-low mode (to be abbreviated as the "HV-Low mode" hereinafter) as a first hybrid mode, a hybrid-high mode (to be abbreviated as the "HV-High mode" hereinafter) as a second hybrid mode, and a fixed mode. Specifically, in the HV-Low mode, a rotational speed of the engine 3 (i.e., a rotational speed of the input shaft 14) is increased higher than a rotational speed of the ring gear 16 of the transmission section 8 when a rotational speed of the first motor 4 is reduced to substantially zero. In turn, in the HV-High mode, a rotational speed of the engine 3 is reduced lower than a rotational speed of the ring gear 16 of the transmission section 8 when a rotational speed of the first motor 4 is reduced to substantially zero. Further, in the fixed mode, the engine 3 and the ring gear 16 of the transmission section 8 are always rotated at substantially same speeds.

The EV mode may be selected from a dual-motor mode in which both of the first motor 4 and the second motor 5 generate drive torques to propel the vehicle Ve, and a single-motor mode in which only the second motor 5 generates a drive torque to propel the vehicle Ve. Further, the dual-motor mode may be selected from an electric vehicle-low mode (to be abbreviated as the "EV-Low mode" hereinafter) in which a torque of the first motor 4 is multiplied by a relatively larger factor, and an electric vehicle-high mode (to be abbreviated as the "EV-High mode" hereinafter) in which a torque of the first motor 4 is multiplied by a relatively smaller factor. In the single-motor mode, the vehicle Ve is powered only by the second motor 5, while engaging the first clutch CL1, while engaging the second clutch CL2, or while disengaging both of the first clutch CL1 and the second clutch CL2.

FIG. 3 shows engagement states of the first clutch CL1, the second clutch CL2, and the brake B1, and operating conditions of the first motor 4, the second motor 5, and the engine 3 in each operating mode. In FIG. 3, "∘" represents that the engagement device is in engagement, "−" represents that the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 3 generates a drive torque, and "OFF" represents that the engine 3 does not generate a drive torque.

Rotational speeds of the rotary elements of the power split mechanism 6, and directions of torques of the engine 3, the first motor 4, and the second motor 5 in each operating mode are indicated in FIGS. 4 to 9. In the nomographic diagrams shown in FIGS. 4 to 9, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 4:
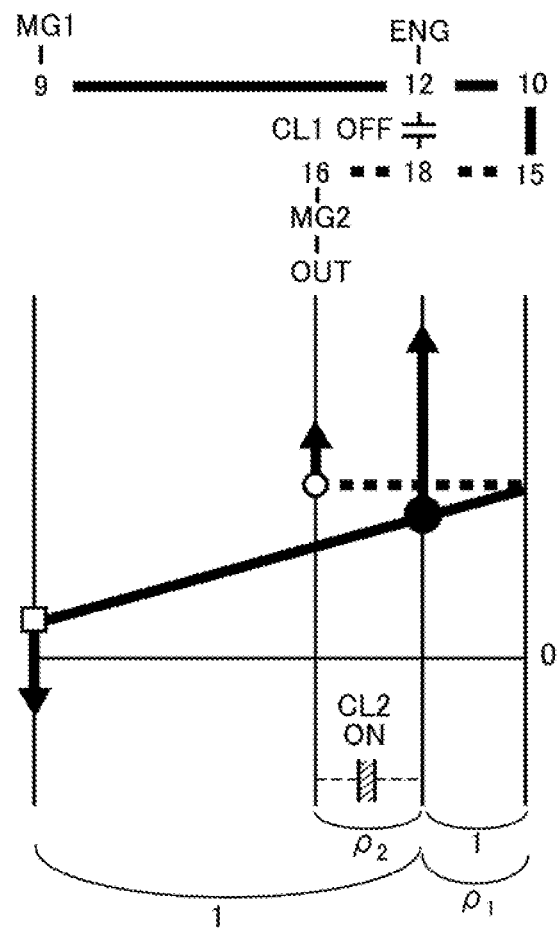
FIG. 4 is a nomographic diagram showing a situation in a HV-High mode.
Figure 5:
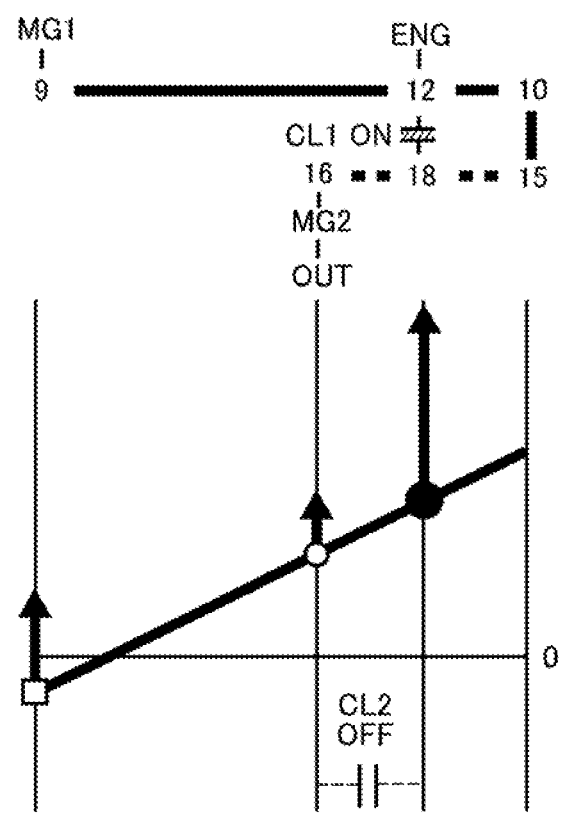
FIG. 5 is a nomographic diagram showing a situation in a HV-Low mode.

As indicated in FIG. 4, in the HV-High mode, the second clutch CL2 is engaged, and the engine 3 generates a drive torque while establishing a reaction torque by the first motor 4. As indicated in FIG. 5, in the HV-Low mode, the first clutch CL1 is engaged, and the engine 3 generates a drive torque while establishing a reaction torque by the first motor 4. In the HV-High mode and the HV-Low mode, a rotational speed of the first motor 4 is controlled in such a manner as to optimize a total energy efficiency in the drive unit 2 including a fuel efficiency of the engine 3 and a driving efficiency of the first motor 4. Specifically, the total energy efficiency in the drive unit 2 may be calculated by dividing a total energy consumption by a power to rotate the front wheels 1R and 1L. A rotational speed of the first motor 4 may be varied continuously, and the rotational speed of the engine 3 is governed by the rotational speed of the first motor 4 and a vehicle speed. That is, the power split mechanism 6 may serve as a continuously variable transmission.

As a result of establishing a reaction torque by the first motor 4, the first motor 4 may serve as a generator. In this situation, therefore, a power of the engine 3 is partially translated into an electric energy, and the remaining power of the engine 3 is delivered to the ring gear 16 of the transmission section 8. Specifically, the reaction torque established by the first motor 4 is governed by a split ratio of the torque delivered from the engine 3 to the first motor 4 side through the power split mechanism 6. Such split ratio between the torque delivered from the engine 3 to the first motor 4 side through the power split mechanism 6 and the torque delivered from the engine 3 to the ring gear 16 differs between the HV-Low mode and the HV-High mode.

Given that the torque delivered to the first motor 4 side is "1", a ratio of the torque applied to the ring gear 16 in the HV-Low mode may be expressed as "$1/(\rho 1 \cdot \rho 2)$", and a ratio of the torque applied to the ring gear 16 in the HV-High mode may be expressed as "$1/(\rho 1)$". In other words, given that the torque of the engine 3 is "1", a ratio of the torque of the engine 3 delivered to the ring gear 16 in the HV-Low mode may be expressed as "$1/(1-(\rho 1 \cdot \rho 2))$", and a ratio of the torque of the engine 3 delivered to the ring gear 16 in the HV-High mode may be expressed as "$1/(\rho 1+1)$". In the above expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are smaller than "1", respectively. That is, in the HV-Low mode, a ratio of the torque delivered to the ring gear 16 is increased in comparison with that in the HV-High mode. Accordingly, the ratio $1/(1-(\rho 1 \cdot \rho 2))$ of the torque of the engine 3 delivered to the ring gear 16 in the HV-Low mode corresponds to a "first predetermined ratio" of the embodiment, and the ratio $1/(\rho 1+1)$ of the torque of the engine 3 delivered to the ring gear 16 in the HV-High mode corresponds to a "second predetermined ratio" of the embodiment.

Here, when the speed of the engine 3 is increased by the torque generated by the engine 3, the output torque of the engine 3 may be calculated by subtracting a torque required to increase the speed of the engine 3 from the torque generated by the engine 3. In the HV mode, the electric power generated by the first motor 4 is supplied to the second motor 5, and in addition, the electric power accumulated in the electric storage device 32 is also supplied to the second motor 5 as necessary.

Figure 6:
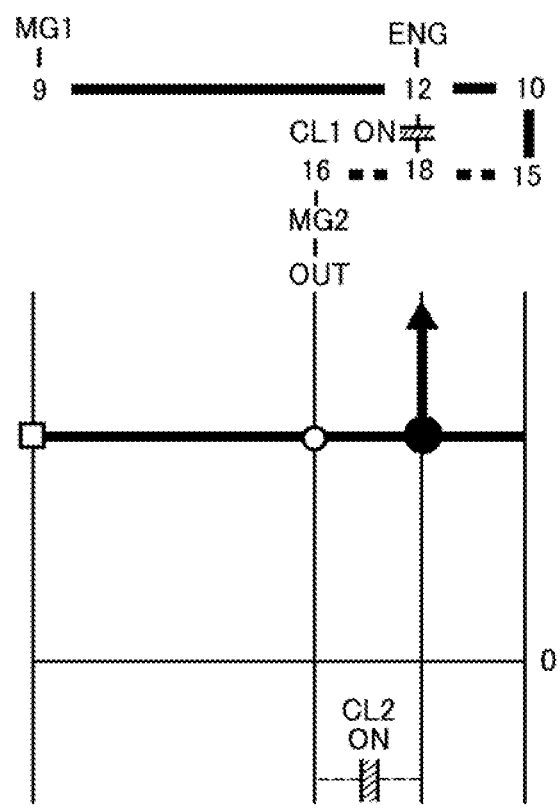
FIG. 6 is a nomographic diagram showing a situation in a fixed mode.

In the fixed mode, as indicated in FIG. 6, both of the first clutch CL1 and the second clutch CL2 are engaged so that all of the rotary elements in the power split mechanism 6 are rotated at same speeds. In other words, the output power of the engine 3 will not be translated into an electric energy by the first motor 4 and the second motor 5. For this reason, a power loss associated with such energy conversion will not be caused in the fixed mode and hence power transmission efficiency can be improved.

Figure 7:
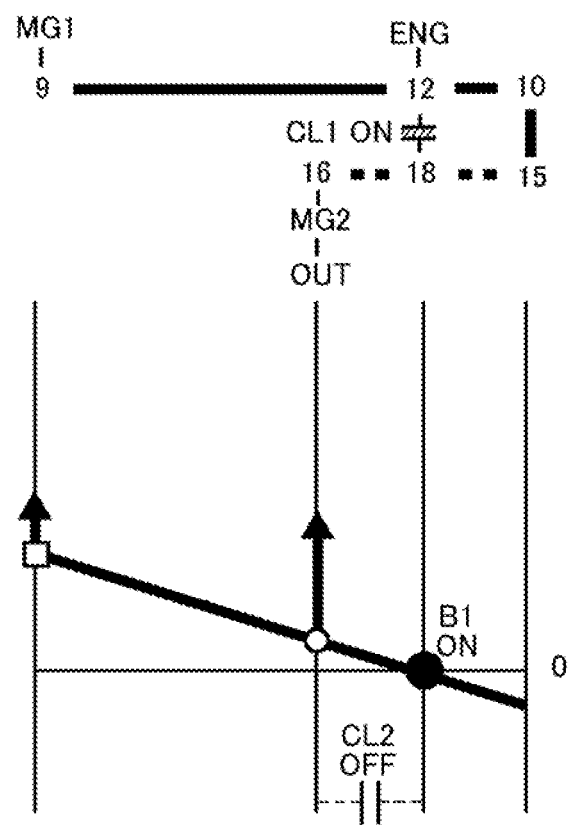
FIG. 7 is a nomographic diagram showing a situation in an EV-Low mode.
Figure 8:
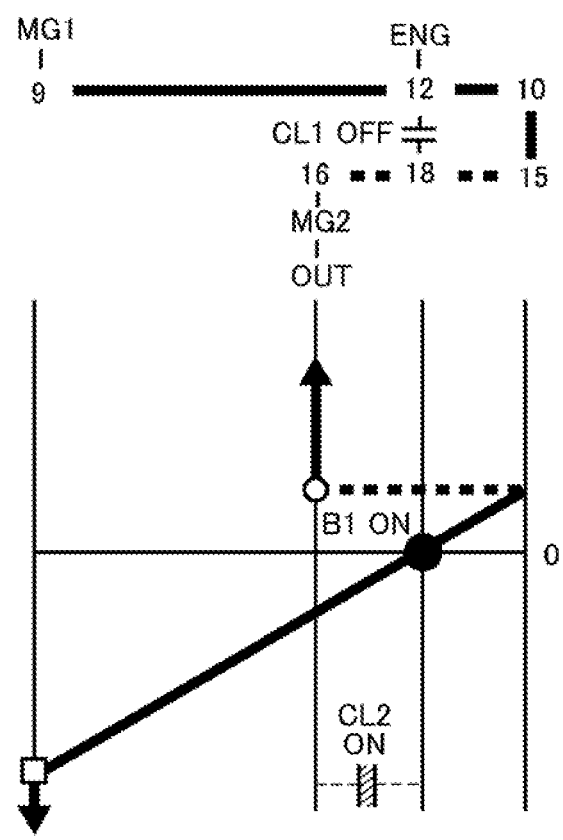
FIG. 8 is a nomographic diagram showing a situation in the EV-High mode.

As indicated in FIGS. 7 and 8, in the EV-Low mode and the EV-High mode, the brake B1 is engaged, and the first motor 4 and the second motor 5 generates the drive torques to propel the vehicle Ve. As indicated in FIG. 7, in the EV-Low mode, the vehicle Ve is propelled by the drive torques generated by the first motor 4 and the second motor 5 while engaging the brake B1 and the first clutch CL1. In this case, the brake B1 establishes a reaction torque to restrict a rotation of the output shaft 13 or the carrier 12. In the EV-Low mode, the first motor 4 is rotated in the forward direction while generating torque in a direction to increase a rotational speed. As indicated in FIG. 8, in the EV-High mode, the vehicle Ve is propelled by drive torques generated by the first motor 4 and the second motor 5 while engaging the brake B1 and the second clutch CL2. In this case, the brake B1 also establishes a reaction torque to restrict a rotation of the output shaft 13 or the carrier 12. In the EV-High mode, the first motor 4 is rotated in the opposite direction (i.e., in a reverse direction) to the rotational direction of the engine 3 in the HV mode, while generating torque in a direction to increase a rotational speed.

Figure 9:
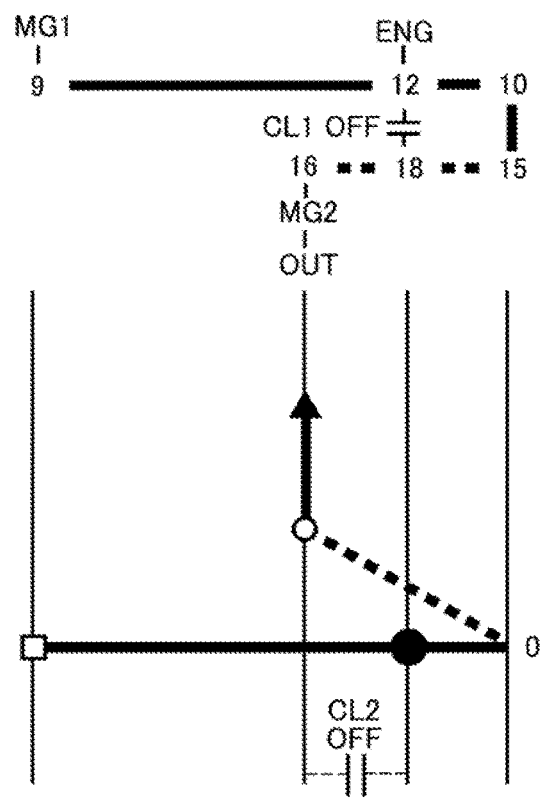
FIG. 9 is a nomographic diagram showing a situation in a single-motor mode.

In the EV-Low mode, a ratio of a rotational speed of the ring gear 16 of the transmission section 8 to a rotational speed of the first motor 4 is reduced smaller than that in the EV-High mode. That is, in the EV-Low mode, the rotational speed of the first motor 4 at a predetermined speed is increased higher than that in the EV-High mode. In other words, a speed reducing ratio in the EV-Low mode is greater than that in the EV-High mode. In the EV-Low mode, therefore, a larger drive force may be generated. Here, in the drive unit 2 shown in FIG. 1, the rotational speed of the ring gear 16 corresponds to a rotational speed of an output member, and the following explanation will be made on the assumption that a gear ratio among each member from the ring gear 16 to the front wheels 1R and 1L is "1" for the sake of convenience. As indicated in FIG. 9, in the single-motor mode, only the second motor 5 generates a drive torque, and both of the first clutch CL1 and the second clutch CL2 are disengaged. In the single-motor mode, therefore, all of the rotary elements of the power split mechanism 6 are stopped.

For this reason, the engine 3 and the first motor 4 will not be rotated passively, and hence the power loss can be reduced.

In the vehicle Ve, the operating mode is selected on the basis of an SOC level of the electric storage device 32, a vehicle speed, a required drive force and so on. According to the embodiment, a selection pattern of the operating mode may be selected from a Charge Sustaining mode (to be abbreviated as the "CS mode" hereinafter) in which the operating mode is selected in such a manner as to maintain the SOC level of the electric storage device 32 as far as possible, and a Charge Depleting mode (to be abbreviated as the "CD mode" hereinafter) in which the operating mode is selected in such a manner as to propel the vehicle Ve while consuming the electric power accumulated in the electric storage device 32. Specifically, the CS mode is selected when the SOC level of the electric storage device 32 is relatively low, and the CD mode is selected when the SOC level of the electric storage device 32 is relatively high.

Figure 10:
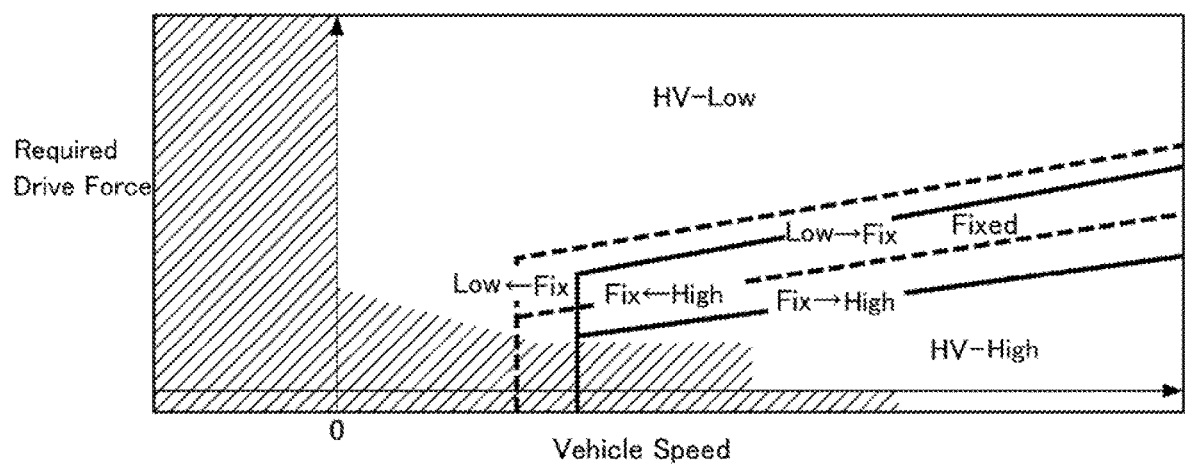
FIG. 10 shows a map for determining an operating mode during propulsion in a CS mode.

FIG. 10 shows an example of a map used to select the operating mode during propulsion in the CS mode. In FIG. 10, the vertical axis represents a required drive force, and the horizontal axis represents a vehicle speed. In order to select the operating mode of the vehicle Ve, the vehicle speed may be detected by a vehicle speed sensor, and the required drive force may be estimated based on an accelerator position detected by an accelerator sensor.

In FIG. 10, the hatched region is an area where the single-motor mode is selected. In the CS mode, the single-motor mode is selected when the vehicle Ve is propelled in a reverse direction irrespective of the required drive force, and when the vehicle Ve is propelled in a forward direction and the required drive force is small (or when decelerating). Such region where the single-motor mode is selected is determined based on specifications of the second motor 5.

During forward propulsion in the CS mode, the HV mode is selected when a large drive force is required. In the HV mode, the drive force may be generated from a low speed range to a high speed range. When the SOC level of the electric storage device 32 falls close to a lower limit level, therefore, the HV mode may be selected even if an operating point governed by the required drive force and the vehicle speed falls within the hatched region.

As described, the HV mode may be selected from the HV-Low mode, the HV-High mode, and the fixed mode. In the CS mode, specifically, the HV-Low mode is selected when the vehicle speed is relatively low and the required drive force is relatively large, the HV-High mode is selected when the vehicle speed is relatively high and the required drive force is relatively small, and the fixed mode is selected when the operating point falls between a region where the HV-Low mode is selected and a region where the HV-High mode is selected.

In the CS mode, the operating mode is shifted from the fixed mode to the HV-Low mode when the operating point is shifted across the "Low←Fix" line from right to left, or when the operating point is shifted across the "Low←Fix" line upwardly from the bottom. By contrast, the operating mode is shifted from the HV-Low mode to the fixed mode when the operating point is shifted across the "Low→Fix" line from left to right, or when the operating point is shifted across the "Low→Fix" line downwardly from the top. Likewise, the operating mode is shifted from the HV-High mode to the fixed mode when the operating point is shifted across the "Fix←High" line from right to left, or when the operating point is shifted across the "Fix←High" line upwardly from the bottom. By contrast, the operating mode is shifted from the fixed mode to the HV-High mode when the operating point is shifted across the "Fix→High" line from left to right, or when the operating point is shifted across the "Fix→High" line downwardly from the top.

Figure 11:
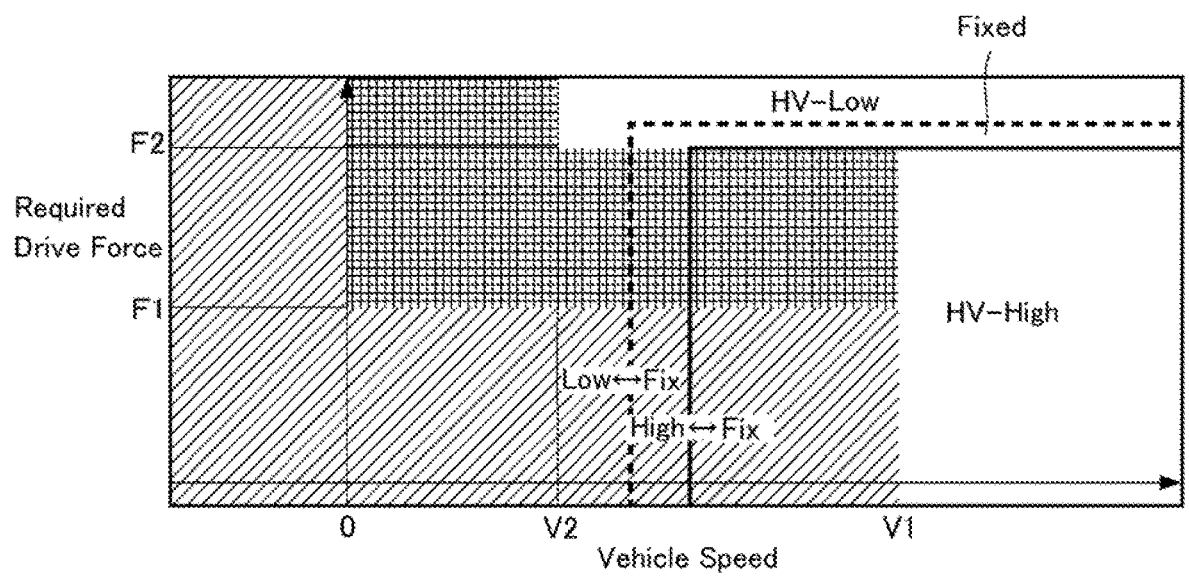
FIG. 11 shows a map for determining an operating mode during propulsion in a CD mode.

FIG. 11 shows an example of a map used to select the operating mode during propulsion in the CD mode. In FIG. 11, the vertical axis also represents the required drive force, and the horizontal axis also represents the vehicle speed.

In FIG. 11, the hatched region is also an area where the single-motor mode is selected. In the CD mode, the single-motor mode is also selected when the vehicle Ve is propelled in the reverse direction irrespective of the required drive force, and when the vehicle Ve is propelled in the forward direction and the required drive force is relatively small (or when decelerating). Such region where the single-motor mode is selected is also determined based on specification of the second motor 5.

During forward propulsion in the CD mode, the dual-motor mode is selected when the drive force larger than a first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, in the HV mode, the drive force may be generated from the low speed range to the high speed range. When the SOC level of the electric storage device 32 falls close to the lower limit level, therefore, the HV mode may be selected even if the operating point falls within the regions where the single-motor mode and the dual-motor mode are selected.

In the CD mode, the HV-Low mode is also selected when the vehicle speed is relatively low and the required drive force is relatively large, the HV-High mode is also selected when the vehicle speed is relatively high and the required drive force is relatively small, and the fixed mode is also selected when the operating point falls between the region where the HV-Low mode is selected and the region where the HV-High mode is selected.

In the CD mode, the operating mode is shifted between the fixed mode and the HV-Low mode when the operating point is shifted across the "Low↔Fix" line. Likewise, the operating mode is shifted between the HV-High mode and the fixed mode when the operating point is shifted across the "Fix↔High".

In the maps shown in FIGS. 10 and 11, the regions of each of the operating mode and the lines defining the regions may be altered depending on temperatures of the members of the drive unit 2, the electric storage device 32, the power control systems 30 and 31, and an SOC level of the electric storage device 32.

As described, the operating mode of the vehicle Ve is shifted among the above-mentioned modes by manipulating the first clutch CL1 and the second clutch CL2. For example, in a case of shifting the operating mode between the HV-Low mode and the HV-High mode, the operating mode may be shifted between the HV-Low mode and the HV-High mode via the fixed mode. As also described, in a case of starting the engine 3 at a low temperature, the operating point of the engine 3 is adjusted to the point suitable to warm up the engine 3 thereby raising the temperature of the of the catalyst 29 to the predetermined activation temperature. In this case, if the operating mode is shifted between the HV-Low mode and the HV-High mode via the fixed mode, or the fixed mode is selected, the operating point of the engine 3 may be deviated from the point at which the catalyst 29 can be warmed up efficiently. As a result, the catalyst may not be warmed up sufficiently and purifying performance of the catalyst may be reduced. In order to avoid such disadvantage, the ECU 33 executes a routine shown in FIG. 12 to selectively restrict a shifting operation between the HV-Low mode and the HV-High mode via the fixed mode. The routine shown in FIG. 12 is repeated at predetermined time interval.

Figure 12:
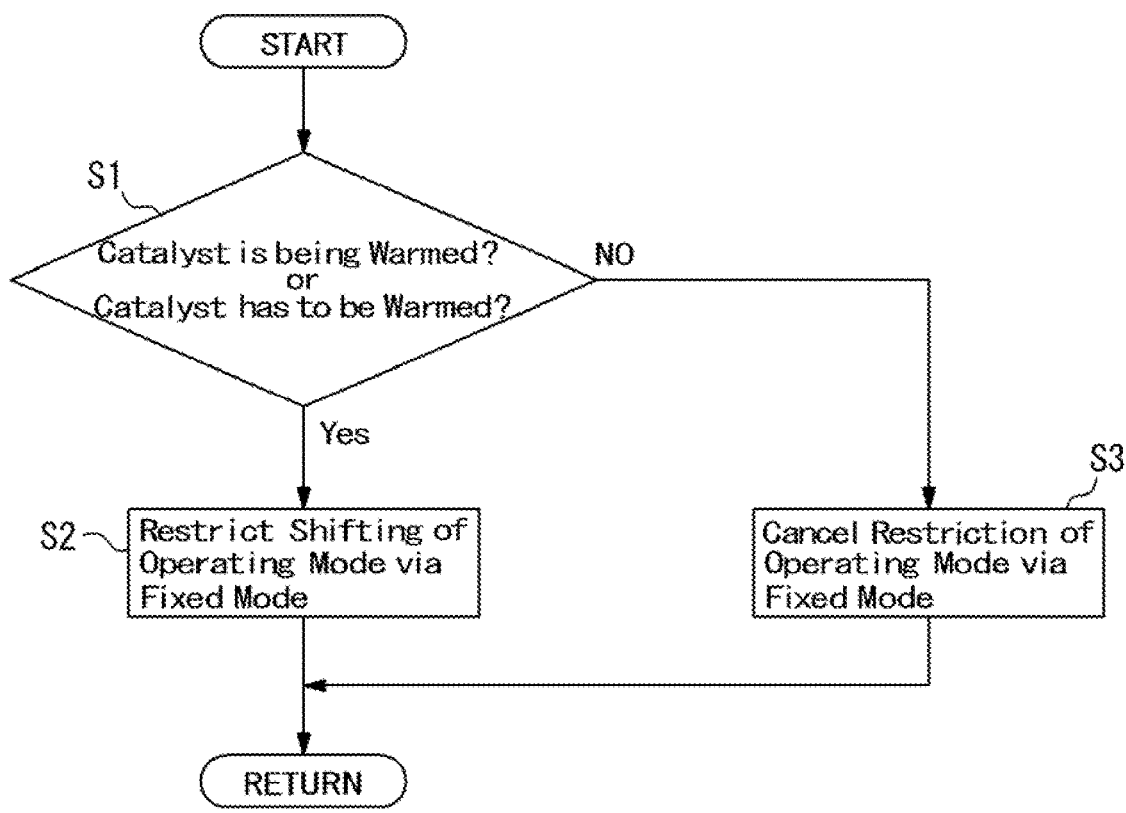
FIG. 12 is a flowchart showing a first example of a routine executed by the control system according to the embodiment.

The shown in FIG. 12 is started when a shifting of the operating mode to the HV-Low mode or to the HV-High mode is demanded. At step S1, it is determined whether the catalyst 29 is currently warmed up or the catalyst 29 has to be warmed up, that is, it is determined whether a temperature of the catalyst 29 has not yet been raised to the activation temperature. Specifically, at step S1, it is determined whether the temperature of the catalyst 29 is lower than the activation temperature. For example, the catalyst 29 has to be warmed up when starting the engine at a low temperature.

If the temperature of the catalyst 29 is lower than the activation temperature so that the answer of step S1 is YES, the routine progresses to step S2 to restrict the shifting operation of the operating mode between the HV-Low mode and the HV-High mode via the fixed mode. In this case, therefore, the operating mode is shifted directly to the HV-Low mode or the HV-High mode without establishing the fixed mode temporarily, or maintained to the current mode. For example, in a case of shifting the operating mode from the HV-Low mode to the HV-High mode during the warm-up of the catalyst 29, the operating mode is shifted directly from the HV-Low mode to the HV-High mode without establishing the fixed mode temporarily. Otherwise, the operating mode may be maintained to the HV-Low mode. By contrast, in a case of shifting the operating mode from the HV-High mode to the HV-Low mode during the warm-up of the catalyst 29, the operating mode is shifted directly from the HV-High mode to the HV-Low mode without establishing the fixed mode temporarily. Otherwise, the operating mode may be maintained to the HV-High mode.

In order to warm up the catalyst 29, specifically, an ignition timing of the engine 3 is retarded. Consequently, combustion takes place during exhaust stroke so as to raise a temperature of the catalyst 29 promptly to the activation temperature by a high-temperature exhaust gas. In this situation, an air/fuel ratio may be adjusted according to need. For example, the air/fuel ratio is adjusted to be richer than a theoretical (or stoichiometric) air/fuel ratio until the temperature of the catalyst 29 is raised to a predetermined level, and then adjusted to a lean-burn ratio until the temperature of the catalyst 29 is raised to the activation temperature. Whereas, during the warm-up of the catalyst 29, the engine 3 is controlled in such a manner as to generate a torque comparative to a friction torque derived from e.g., an inertia of the engine 3 itself.

By contrast, if the temperature of the catalyst 29 is equal to or higher than the activation temperature, that is, if the catalyst 29 does not have to be warmed up so that the answer of step S1 is NO, the routine progresses to step S3 to cancel the restriction of the shifting operation to the HV-Low mode or the HV-High mode via the fixed mode.

Figure 13:
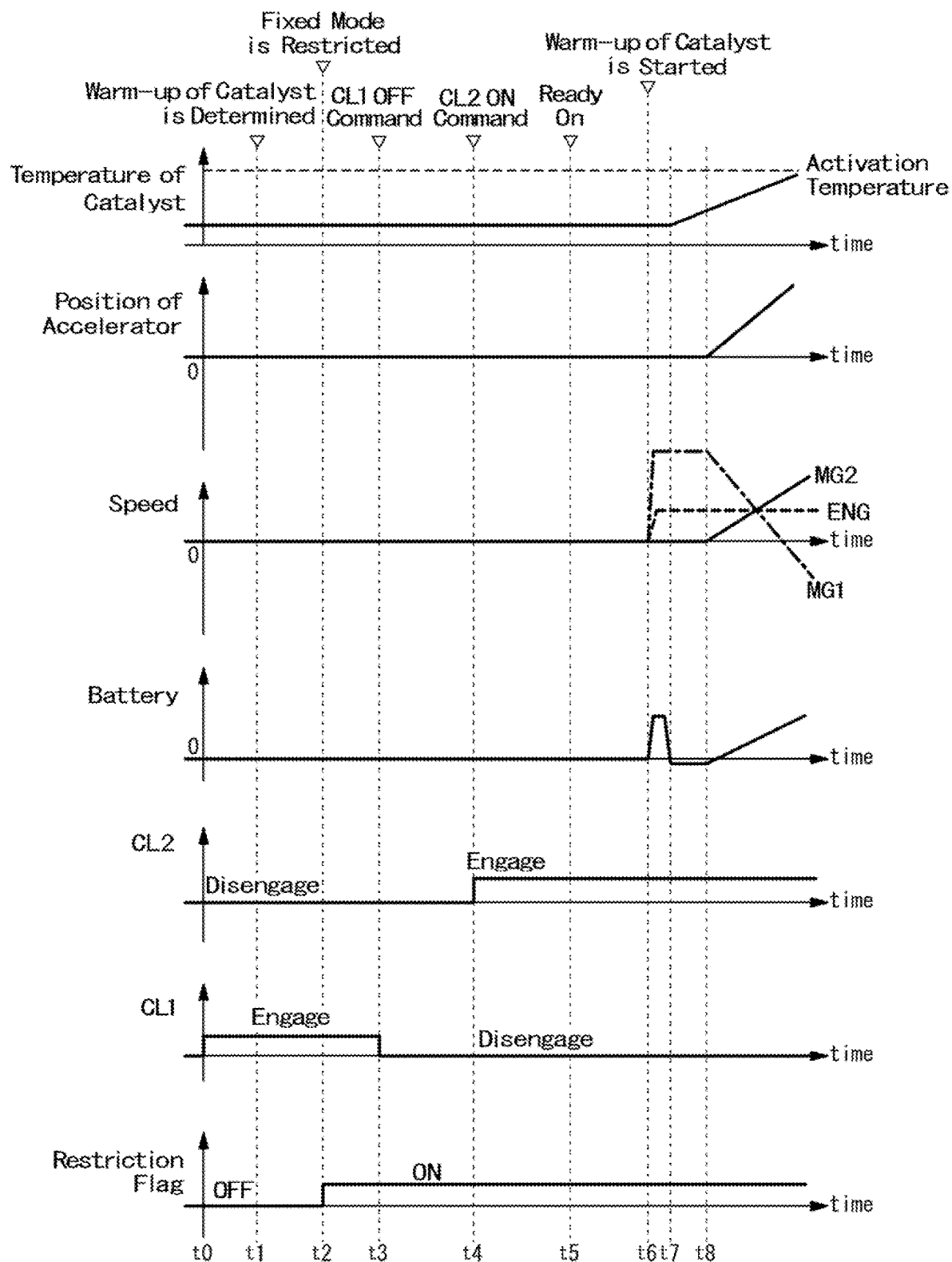
FIG. 13 is a time chart indicating temporal changes in conditions of the hybrid vehicle during execution of the routine shown in FIG. 12.

Temporal changes of the conditions of the vehicle Ve in the case that the catalyst 29 has to be warmed are indicated in FIG. 13. Specifically, FIG. 13 shows temporal changes in a temperature of the catalyst 29, a position of the accelerator pedal, speeds of the prime movers, an operating condition of the electric storage device 32, engagement states of the first clutch CL1 and the second clutch CL2, and restriction of the shifting operation to the HV-Low mode or the HV-High mode via the fixed mode.

At point t0, a driver turned on a main switch or the like to startup the vehicle Ve, and consequently, the control system including the ECU 33 is activated. At point t1, a temperature of the catalyst 29 is detected, and the ECU 33 determines to warm up the catalyst 29 based on a fact that the detected temperature of the catalyst 29 is lower than the activation temperature. Consequently, at point t2, a restriction flag to restrict the shifting operation to the HV-Low mode or the HV-High mode via the fixed mode is turned on.

When stopping the vehicle Ve during propulsion in the HV mode, the vehicle Ve is stopped in the HV-Low mode in most cases, and after launching the vehicle Ve, the operating mode is expected to be shifted to the HV-High mode with an increase in the vehicle speed and a reduction in the required drive force. In the example shown in FIG. 13, therefore, the operating mode is shifted to the HV-High mode before starting the warm-up of the catalyst 29. To this end, the first clutch CL1 is disengaged at point t3, and the second clutch CL2 is engaged at point t4. The above-explained disengagement of the first clutch CL1 and engagement of the second clutch CL2 may be executed simultaneously. In a case that the vehicle was stopped in the HV-High mode, the first clutch CL1 may be engaged and the second clutch CL2 may be disengaged to shift the operating mode to the HV-Low mode according to need, before starting the warm-up of the catalyst 29.

Then, the vehicle Ve is brought into a ready-on state at step S5, and the warm-up of the catalyst 29 is started at point t6. In this situation, specifically, a rotational sped of the engine 3 is raised by the first motor 4 to a self-sustaining speed, while adjusting the operating point of the engine 3 to the point suitable to warm up the catalyst 29. For this purpose, the electric power of the electric storage device 32 is supplied to the first motor 4 from point t6 to operate the first motor 4 as a motor for cranking the engine 3, and as explained above, the ignition timing of the engine 3 is retarded to raise the temperature of the catalyst 29 rapidly to the activation temperature. After the engine 3 is ignited, the first motor 4 is driven as a generator from point t6 to point t8 thereby charging the electric storage device 32.

Consequently, the temperature of the catalyst 29 is raised gradually from point t7. Thereafter, the driver starts depressing the accelerator pedal from point t8, and a speed of the second motor 5 is increased with a depression of the accelerator pedal.

Thus, according to the embodiment of the present disclosure, the shifting operation between the HV-Low mode and the HV-High mode via the fixed mode is restricted if the temperature of the catalyst 29 is lower than the activation temperature. According to the embodiment of the present disclosure, therefore, the operating point of the engine 3 will not be deviated from the point suitable to warm up the catalyst 29 in the fixed mode during execution of the warm-up of the catalyst 29. For this reason, the temperature of the catalyst 29 may be raised promptly to the activation temperature to purify the exhaust gas.

As described, in the case of restricting the shifting operation between the HV-Low mode and the HV-High mode via the fixed mode, the operating mode may be maintained to the current mode, or may be shifted to the desired mode without establishing the fixed mode temporarily. For example, such determination may be made based on a required drive force.

Figure 14:
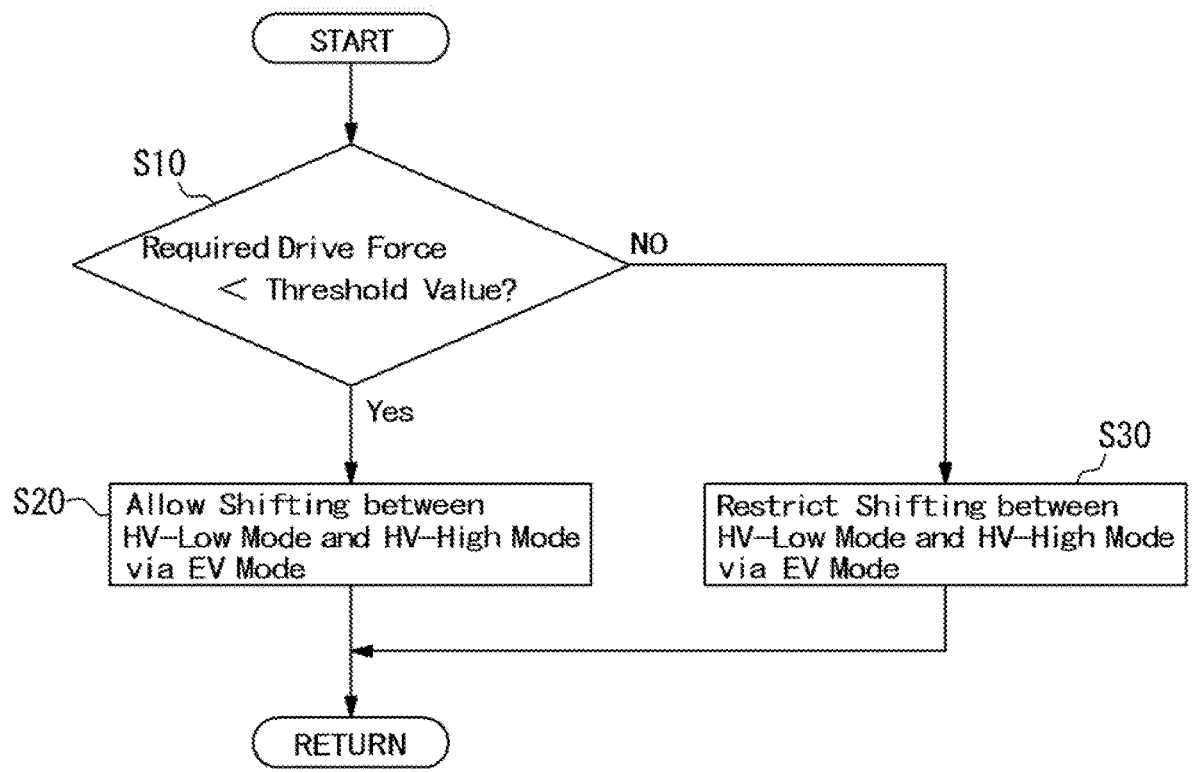
FIG. 14 is a flowchart showing a second example of a routine executed by the control system according to the embodiment.
Figure 15:
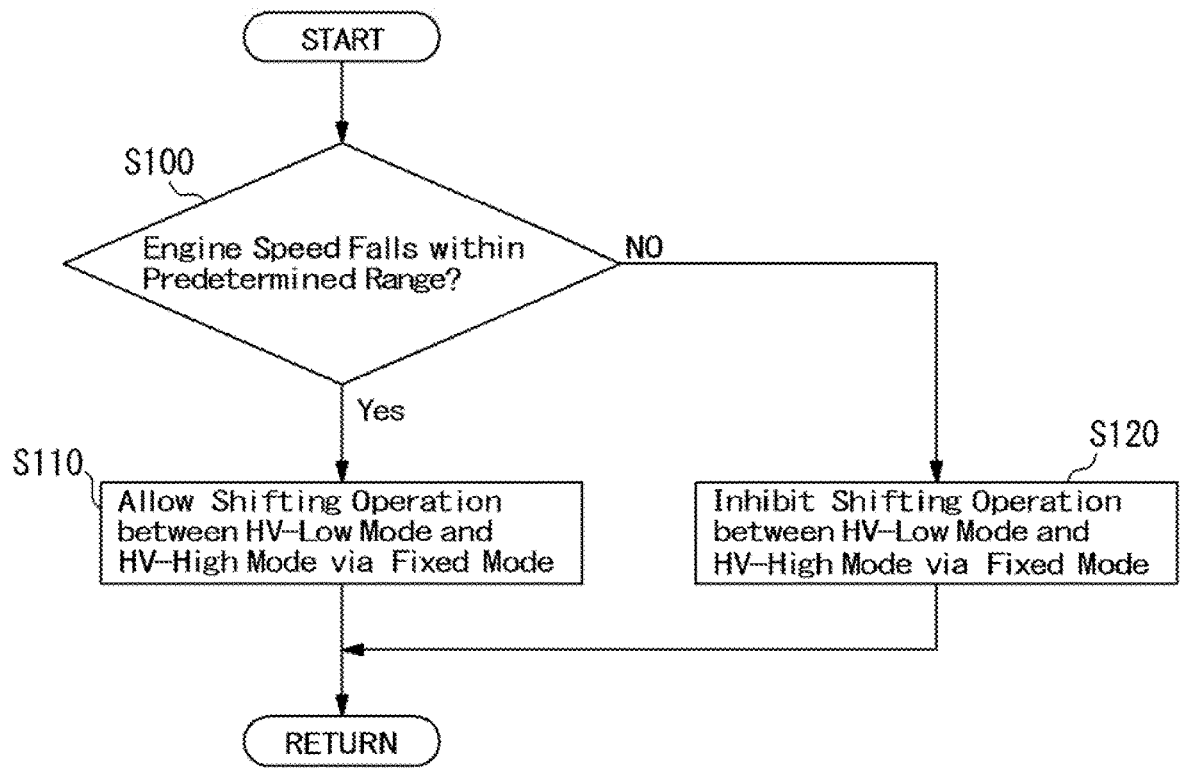
FIG. 15 is a flowchart showing a third example of a routine executed by the control system according to the embodiment.

Turning to FIG. 14, there is shown an example of a routine to determine whether to maintain the operating mode to the current mode or to shift the operating mode to the desired mode. At step S10, it is determined whether a required drive force governed by a position of the accelerator pedal and a speed of the vehicle Ve is less than a predetermined threshold value set to a maximum drive force possible to be generated in the EV mode. If the required drive force is less than the threshold value so that the answer of step S10 is YES, the routine progresses to step S20 to allow execution of a shifting operation between the HV-Low mode and the HV-High mode via the EV mode including the single-motor mode and the dual-motor mode in which the engine 3 is disconnected from the powertrain. In other words, a shifting operation between the HV-Low mode and the HV-High mode without establishing the fixed mode temporarily is allowed. In this case, specifically, the engine 3 is stopped temporarily to interrupt the warm-up of the catalyst 29 and disconnected from the powertrain so as to establish the EV mode during the engagement and disengagement of the first clutch CL1 and the second clutch CL2. After shifting the operating mode to the desired HV mode by manipulating the first clutch CL1 and the second clutch CL2, the engine 3 is started to warm up the catalyst 29.

By contrast, if the required drive force is equal to or greater than the threshold value so that the answer of step S10 is NO, the routine progresses to step S30 to restrict the shifting operation between the HV-Low mode and the HV-High mode via the EV mode. In other words, the current mode (i.e., the HV-High mode or HV-Low mode) is maintained to achieve the required drive force while warming the catalyst 29.

Thus, in the case that the required drive force is less than the threshold value, the operating mode is shifted between the HV-Low mode and the HV-High mode while stopping the engine 3 and disconnecting the engine 3 from the powertrain. In this case, therefore, the engine 3 will not discharge the exhaust gas while the engine 3 is stopped, and the engine 3 can be operated at the point suitable to warm the catalyst 29 after started. By contrast, in the case that the required drive force is equal to or greater than the threshold value, the operating mode is maintained to the current HV mode. In this case, therefore, the engine 3 can be operated at the point suitable to warm the catalyst 29 while achieving the required drive force.

Although the above exemplary embodiments of the present disclosure have been described, it will be understood by those skilled in the art that the present disclosure should not be limited to the described exemplary embodiments, and various changes and modifications can be made within the scope of the present disclosure. In the foregoing first example of the routine shown in FIG. 12, the shifting operation between the HV-Low mode and the HV-High mode via the fixed mode is selectively restricted. However, according to the embodiment of the present disclosure, such shifting operation between the HV-Low mode and the HV-High mode via the fixed mode is not completely inhibited. That is, if a condition to prevent deviation of the operating point of the engine 3 from the point suitable to warm the catalyst 29 is satisfied, the operating mode may be shifted the HV-Low mode and the HV-High mode via the fixed mode. For example, if a speed of the vehicle Ve is increased or decreased so that the speed of the engine 3 is adjusted within a range suitable to warm the catalyst 29, the operating mode may be shifted the HV-Low mode and the HV-High mode via the fixed mode. Specifically, when rotational speeds of the ring gear 16 and the carrier 12 are synchronized with each other and brought within the range suitable to warm up the catalyst 29 due to change in the speed of the vehicle Ve, the operating mode may be shifted the HV-Low mode and the HV-High mode via the fixed mode.

Turning to FIG. 14, there is shown an example of a routine to selectively allow the shifting operation between the HV-Low mode and the HV-High mode via the fixed mode. At step S100, it is determined whether the speed of the engine 3 falls within the range suitable to warm the catalyst 29. If the speed of the engine 3 falls within the range suitable to warm the catalyst 29 so that the answer of step S100 is YES, the routine progresses to step S110 to allow the shifting operation between the HV-Low mode and the HV-High mode via the fixed mode. By contrast, if the speed of the engine 3 is out of the range suitable to warm the catalyst 29 so that the answer of step S100 is NO, the routine progresses to step S120 to inhibit the shifting operation between the HV-Low mode and the HV-High mode via the fixed mode. Thus, if the speed of the engine 3 falls within the range suitable to warm up the catalyst 29, the catalyst 29 can be warmed up promptly even if the operating mode is shifted between the HV-Low mode and the HV-High mode via the fixed mode.

What is claimed is:

1. A control system for a hybrid vehicle, comprising:
an engine;
a purification device that purifies an exhaust gas of the engine;
a first motor having a generating function; and
a differential mechanism comprising an input element connected to the engine, a reaction element connected to the first motor, and an output element connected to a drive wheel,
wherein an operating mode of the hybrid vehicle can be selected from
a first hybrid vehicle mode in which a speed ratio between the engine and the output member can be varied continuously by the differential mechanism, and a torque of the engine is delivered to the output member at a first predetermined ratio,
a second hybrid vehicle mode in which the speed ratio between the engine and the output member can be varied continuously by the differential mechanism, and the torque of the engine is delivered to the output member at a second predetermined ratio that is smaller than the first predetermined ratio, and
a fixed mode in which the input element and the output element are rotated at same speeds,
the control system comprising a controller that is configured to
determine whether the purifying device is being warmed or the purifying device has to be warmed, when shifting the operating mode between the first hybrid vehicle mode and the second hybrid vehicle mode, and
restrict a shifting operation between the first hybrid vehicle mode and the second hybrid vehicle mode via the fixed mode, if the purifying device is being warmed or the purifying device has to be warmed.

2. The control system for the hybrid vehicle as claimed in claim 1, wherein the controller is further configured to determine that the purifying device has to be warmed if a temperature of the purifying device is lower than a predetermined level.

3. The control system for the hybrid vehicle as claimed in claim 1, wherein the controller is further configured to raise the temperature of the purifying device by retarding an ignition timing of the engine.

4. The control system for the hybrid vehicle as claimed in claim 1, wherein the controller is further configured to shift the operating mode between the first hybrid vehicle mode and the second hybrid vehicle mode before starting a warm-up of the purifying device, if the purifying device has to be warmed.

5. The control system for the hybrid vehicle as claimed in claim 1, wherein the controller is further configured to maintain a current operating mode or to shift the operating mode between the first hybrid vehicle mode and the second hybrid vehicle mode without establishing the fixed mode temporarily, when restricting the shifting operation between the first hybrid vehicle mode and the second hybrid vehicle mode via the fixed mode.

6. The control system for the hybrid vehicle as claimed in claim 5, wherein the controller is further configured to
 determine whether to maintain the operating mode to the current mode or to shift the operating mode between the first hybrid vehicle mode and the second hybrid vehicle mode without establishing the fixed mode temporarily, based on a required drive force,
 shift the operating mode between the first hybrid vehicle mode and the second hybrid vehicle mode without establishing the fixed mode temporarily if the required drive force is less than a predetermined value, and
 maintain the operating mode to the current mode if the required drive forced is equal to or greater than the predetermined value.

7. The control system for the hybrid vehicle as claimed in claim 1, wherein the controller is further configured to allow the shifting operation between the first hybrid vehicle mode and the second hybrid vehicle mode via the fixed mode, if the speed of the engine falls within a predetermined range suitable to warm the purifying device.

8. The control system for the hybrid vehicle as claimed in claim 1,
wherein the hybrid vehicle further comprises a second motor that is connected to drive wheels in a torque transmittable manner,
the differential mechanism includes
 a first planetary gear unit that performs a differential action among a first input element, a first reaction element, and a first output element,
 a second planetary gear unit that performs a differential action among a second input element, a second reaction element, and a second output element,
 a first engagement device that selectively connects the first input element to the second input element, and
 a second engagement device that selectively connects any two of the rotary elements to rotate the second planetary gear unit integrally,
the first input element is connected to the engine,
the first reaction element is connected to the first motor,
the first output element is connected to the second input element,
the second output element is connected to a member of the drive wheel side,
the first hybrid vehicle mode is established by engaging the first engagement device while disengaging the second engagement device,
the second hybrid vehicle mode is established by disengaging the first disengagement device while engaging the second engagement device, and
the fixed mode is established by engaging both of the first disengagement device and the second engagement device.

* * * * *

UNITED STATES PATENT AND TRADEMARK OFFICE
CERTIFICATE OF CORRECTION

| | |
|---|---|
| PATENT NO. | : 11,242,046 B2 |
| APPLICATION NO. | : 16/601716 |
| DATED | : February 8, 2022 |
| INVENTOR(S) | : Tatsuya Imamura et al. |

It is certified that error appears in the above-identified patent and that said Letters Patent is hereby corrected as shown below:

In the Claims

Column 17, Line 24 - change "required drive forced is equal to or greater than the" to "required drive force is equal to or greater than the".

Signed and Sealed this
Fifth Day of July, 2022

Katherine Kelly Vidal
*Director of the United States Patent and Trademark Office*